(12) United States Patent
Wichmann

(10) Patent No.: US 11,096,385 B2
(45) Date of Patent: Aug. 24, 2021

(54) SYSTEM AND METHOD FOR APPLYING LIQUID MIXTURES

(75) Inventor: Wolf-Dieter Wichmann, Neetzow (DE)

(73) Assignee: BASF SE, Ludwigshafen (DE)

( * ) Notice: Subject to any disclaimer, the term of this patent is extended or adjusted under 35 U.S.C. 154(b) by 446 days.

(21) Appl. No.: 14/364,901

(22) PCT Filed: Dec. 14, 2011

(86) PCT No.: PCT/EP2011/072802
§ 371 (c)(1),
(2), (4) Date: Jul. 21, 2015

(87) PCT Pub. No.: WO2013/087103
PCT Pub. Date: Jun. 20, 2013

(65) Prior Publication Data
US 2015/0351376 A1    Dec. 10, 2015

(51) Int. Cl.
*G05B 7/00*    (2006.01)
*A01M 7/00*    (2006.01)
*G05B 15/02*    (2006.01)

(52) U.S. Cl.
CPC ........... *A01M 7/0092* (2013.01); *G05B 15/02* (2013.01)

(58) Field of Classification Search
CPC .................................................. A01M 7/0092
USPC ........................................................ 717/283
See application file for complete search history.

(56) References Cited

U.S. PATENT DOCUMENTS

| | | | | |
|---|---|---|---|---|
| 2,324,400 A | * | 7/1943 | Roberts | ...................... C02F 1/24 210/703 |
| 2,604,443 A | * | 7/1952 | Fipps | .................. B01D 21/2433 210/141 |
| 3,035,293 A | * | 5/1962 | Larson | ...................... B60S 3/06 15/53.3 |

(Continued)

FOREIGN PATENT DOCUMENTS

| | | |
|---|---|---|
| DE | 3908963 | 9/1990 |
| DE | 9402611 | 4/1994 |

(Continued)

OTHER PUBLICATIONS

Office Action, issued in corresponding JP Application No. 2014-543661, dated Oct. 6, 2015.

(Continued)

*Primary Examiner* — Evral E Bodden
(74) *Attorney, Agent, or Firm* — Marshall, Gerstein & Borun LLP

(57) ABSTRACT

The present invention relates to a system for dispensing liquid mixtures, having a main stream line for passage of a main stream of a carrier liquid, a secondary stream line, which branches off from the main stream line at a first junction and leads back into the main stream line at a second junction, and at least one tank for accommodating a mixture component, the tank having a discharge opening connected to the secondary stream line. The system tank includes a metering pump for delivering the mixture component located in the tank through the discharge line into the secondary stream line and the system comprises a drive unit which is coupled detachably to the metering pump to drive the metering pump. The invention further relates to a method of using the above-stated system and to use of the system to dispense a plant protection product.

21 Claims, 2 Drawing Sheets

(56) References Cited

U.S. PATENT DOCUMENTS

Figure 1:
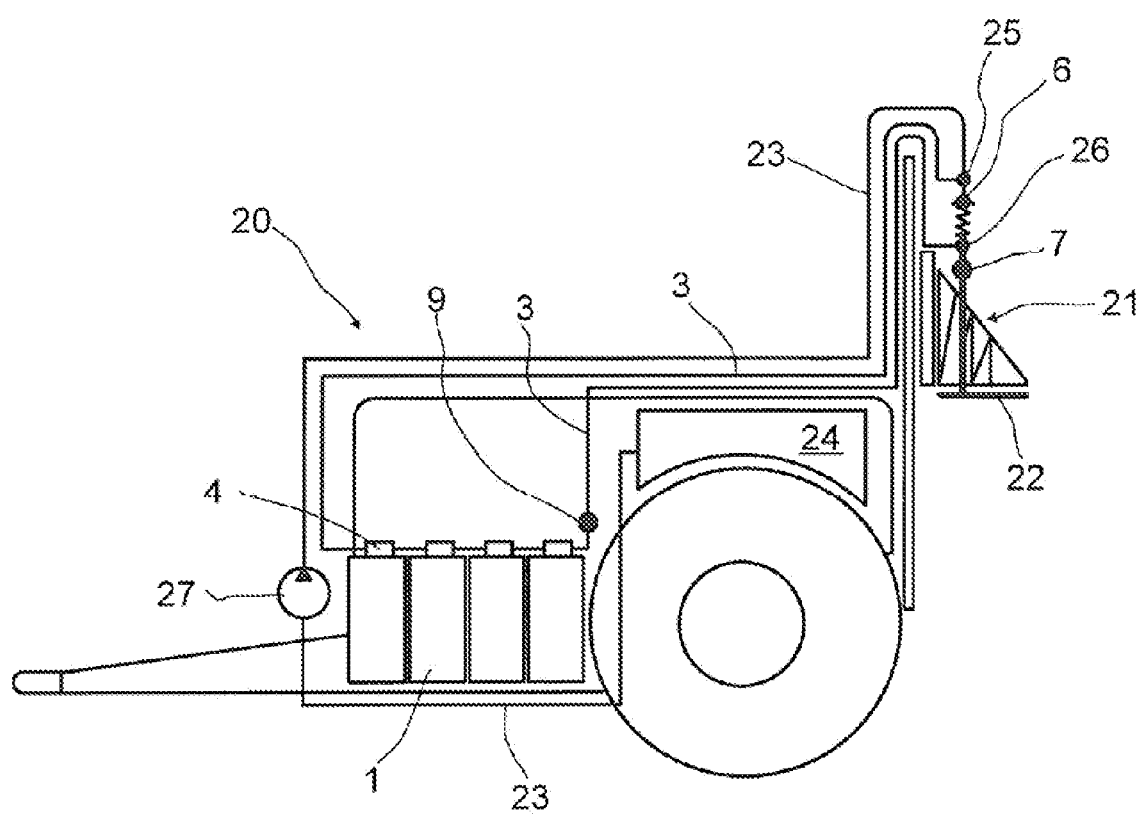

| | | | | |
|---|---|---|---|---|
| 3,386,419 | A | * | 6/1968 | Van Den Broek ..... B01D 24/12 122/18.31 |
| 3,987,537 | A | * | 10/1976 | Warren ................. G01V 1/201 29/592.1 |
| 4,373,669 | A | | 2/1983 | Swanson |
| 4,895,303 | A | | 1/1990 | Freyvogel |
| 5,737,221 | A | | 4/1998 | Newton |
| 5,890,520 | A | * | 4/1999 | Johnson, Jr. ........... B67D 7/067 141/231 |
| 5,913,344 | A | * | 6/1999 | Wronski ................. F17C 5/005 141/4 |
| 6,073,840 | A | * | 6/2000 | Marion ................. B67D 7/067 235/381 |
| 6,089,284 | A | * | 7/2000 | Kaehler ................. G06Q 50/06 141/2 |
| 6,169,938 | B1 | * | 1/2001 | Hartsell, Jr. ......... B67D 7/0401 141/198 |
| 6,571,151 | B1 | * | 5/2003 | Leatherman ........... B67D 7/145 141/94 |
| 8,896,424 | B2 | | 11/2014 | Reif et al. |
| 9,045,352 | B2 | * | 6/2015 | Shariff ..................... C02F 1/00 |
| 9,220,934 | B2 | * | 12/2015 | Mallon ................... A62C 27/00 |
| 9,878,897 | B2 | | 1/2018 | Rogers ................... B67D 7/222 |
| 2002/0046117 | A1 | * | 4/2002 | Marion .............. G06Q 30/0226 705/14.38 |
| 2004/0035949 | A1 | | 2/2004 | Elkins et al. |
| 2004/0177885 | A1 | * | 9/2004 | Shepard .............. G01M 3/2892 137/565.01 |
| 2007/0040050 | A1 | | 2/2007 | Wichmann |
| 2008/0078843 | A1 | * | 4/2008 | Wichmann .............. F04B 13/00 239/1 |
| 2009/0095351 | A1 | * | 4/2009 | Greening .................. F17D 3/12 137/3 |
| 2011/0124834 | A1 | * | 5/2011 | Heilek .................... C07C 51/43 526/317.1 |
| 2011/0166689 | A1 | * | 7/2011 | Alden .................... G05B 15/02 700/108 |
| 2014/0277780 | A1 | * | 9/2014 | Jensen .................. B05B 12/004 700/283 |

FOREIGN PATENT DOCUMENTS

| | | | |
|---|---|---|---|
| DE | 10353789 | 8/2005 | |
| DE | 102006045449 | 3/2008 | |
| DE | 102006045450 | 3/2008 | |
| DE | 102009026234 | 2/2011 | |
| EP | 0086029 | 8/1983 | |
| EP | 1378293 | 1/2004 | |
| EP | 1749443 | 2/2007 | |
| EP | 1902774 A1 | * 3/2008 | ........... B01F 5/0206 |
| EP | 2084964 | 8/2009 | |
| JP | 11-319658 | 11/1999 | |
| WO | WO 2010052002 | 5/2010 | |

OTHER PUBLICATIONS

International Search Report, PCT/EP2011/072802, filed Dec. 14, 2011, report dated Sep. 19, 2012.

International Preliminary Report on Patentability, PCT/EP2011/072802, filed Dec. 14, 2011.

* cited by examiner

SYSTEM AND METHOD FOR APPLYING LIQUID MIXTURES

This application is a National Stage application of International Application No. PCT/EP2011/072802, filed Dec. 14, 2011, the entire contents of which is hereby incorporated herein by reference.

The present invention relates to a system for dispensing liquid mixtures, having a main stream line for passage of a main stream of a carrier liquid, a secondary stream line, which branches off from the main stream line at a first junction and leads back into the main stream line at a second junction, and at least one tank for accommodating a mixture component, the tank comprising a discharge opening connected to the secondary stream line. The invention also relates to a method for dispensing liquid mixtures. The system or the method are suitable in particular for dispensing or atomizing liquid mixtures comprising a plant protection product. In this case the mixture component accommodated in the tank comprises an active compound, in particular a plant protection product.

It is known, when dispensing plant protection products, in particular in agriculture, initially to produce a mixture of water and a plant protection product concentrate in a spray mix tank. The dilute plant protection product present in the spray mix tank is then applied to the field by means of a plant protection sprayer.

It is additionally known from U.S. Pat. No. 5,737,221 to apply a plant protection product present in granular form in a tank in metered manner directly onto the field. For this purpose, an electromechanically actuatable metering device is located in the bottom of the tank, which controls release of the plant protection product.

Systems are additionally known which have "direct metering" or "direct injection", in which the plant protection product is drawn in from a shipping container or from a storage tank associated with the system, delivered to the feed-in point and finally fed into the stream of a carrier liquid. To deliver the plant protection product a metering pump may in this case be used.

With such metering systems it is known, moreover, to use technical apparatus which returns the system's liquid content remaining after the spraying process into the shipping container or a storage tank associated with the system, to avoid undiluted residual quantities in the system.

In systems with direct metering it is furthermore necessary to flush metering pumps and other apparatus which come into contact in particular with concentrated plant protection product. In this case it is important for the flushing liquid not to contaminate the tank holding the supply of carrier liquid, i.e. in particular the water supply.

Known systems for direct metering of plant protection products used in agriculture are mounted on a "field sprayer". This conventionally comprises metering pumps for each plant protection product to be metered. The problem then arises that the volumetric flow rate to be dispensed of the dilute plant protection product may differ widely. The volumetric flow rate in agricultural plant protection may range from at least 0.2 l/ha to 5 l/ha over different boom widths, of for example 18 m to 36 m. Operating speeds may vary in such cases between 3 km/h and 15 km/h. To satisfy these requirements the metering pump in conventional systems has to be designed such that it may meter a volumetric flow rate of 0.08 l/min to approx. 2.80 l/min. To this end, very complicated metering pumps are required, which have multiple metering ranges. For this reason, known plant protection direct metering systems are very complex and technically complicated.

An agricultural spraying apparatus is known from EP 1 749 443 A1 for spraying sprays in the form of a carrier liquid mixed with at least one active compound. The spraying apparatus comprises a tank for accommodating the carrier liquid and a tank for accommodating an active compound. The spraying apparatus additionally comprises a mixing chamber for mixing the carrier liquid with the active compound, to provide the spray. Connecting lines are provided for feeding the respective active compound into the mixing chamber and connecting lines are provided for feeding the carrier liquid into the mixing chamber. The active compound, mixed with the carrier liquid, is ejected via a delivery structure connected to the mixing chamber. So that active compounds which are not in liquid form may also be used, the spraying apparatus additionally comprises a blending chamber, in which an active compound present in granular or pulverulent form is blended and converted into liquid form.

DE 39 08 963 A1 discloses an apparatus for applying plant treatment products with speed-dependent direct feed. With this apparatus the diluent is delivered by means of a pump from a storage tank into a mixing chamber. As the diluent is delivered, pressure adjustment is performed, such that the diluent is supplied to the mixing chamber under constant fluid pressure. A concentrate of a plant treatment product is also injected into the mixing chamber via a metering device. The mixture passes from the mixing chamber to the spray nozzles of a spray boom.

DE 103 53 789 A1 discloses a method for direct metering of an active compound of a plant protection spray. The method is distinguished in that the active compound is added to the carrier liquid directly at the nozzle holders.

A further spray device for direct metering of a plant protection product is known from DE 10 2006 045 450 B4. With this spraying device, active compound is fed by means of a metering pump via an active compound feed line into a carrier liquid line, a sensor being provided in or on the active compound feed line in the region where the active compound feed line leads into the carrier liquid line, which sensor at least detects the presence of liquid and outputs a corresponding signal.

Finally, DE 10 2006 045 449 A1 discloses a spraying device for atomizing sprays for plant protection, in which a metering pump for metering the plant protection product and a mixing apparatus are used. In the mixing apparatus the carrier liquid is mixed with the plant protection product. It comprises a main stream line, an active compound line and a mixing chamber. The mixing chamber is arranged in a secondary stream line branching off from the main stream line and leading back into it.

It is an object of the present invention to provide a system and a method of the above-mentioned type, with which the mixture component located in the tank may be metered very accurately into the main stream line and which may also be inexpensively produced.

This object is achieved according to the invention by a system having the features of claim 1 and a method having the features of claim 10. Advantageous embodiments and further developments of the system according to the invention and of the method according to the invention are revealed by the dependent claims.

In the system according to the invention of the above-mentioned type the tank comprises a metering pump for delivering the mixture component located in the tank into the secondary stream line. The system additionally comprises a drive unit, which is coupled detachably to the metering pump to drive the metering pump.

In the system according to the invention the metering pump is in particular a fixed component of the tank. It is preferably an integral part of the tank. The drive unit, on the other hand, is independent of the metering pump. In agricultural use, it may for example be part of a field sprayer. When the system is in use, the drive unit is coupled to the metering pump, such that the mixture component accommodated in the tank may be metered by means of the tank's metering pump directly into the carrier liquid stream. In this case, however, the mixture component is not metered into the main stream of the carrier liquid, but instead into the secondary stream of the secondary stream line. In this way, particularly accurate metering may be achieved. At the same time, next to none of the system independent of the tank comes directly into contact with the undiluted mixture component. In particular, it is not necessary to flush the system if a tank with another mixture component is used.

The tank is in particular a refillable interchangeable container. Since the metering pump is an integral part of the tank, the tank is self-metering. By integrating the metering pump into the tank, the metering pump may be designed precisely, with regard to its delivery volume, to match the recommended application rate for the mixture component contained therein. In particular, it is not necessary for the metering pump to be able to meter over a wide range of different volumetric flow rates. This has the advantage that an inexpensive simple metering pump may be used with just one metering range.

According to a further development of the system according to the invention, the drive unit drives the metering pump hydraulically. The metering pump is provided in particular in the container, i.e. in the tank, with a direct hydraulic drive. This hydraulic drive proceeds from outside, however, in particular from an apparatus, for example a field sprayer. This reduces technical complexity and the resultant costs for the tank or the interchangeable container.

According to one embodiment of the system according to the invention, a secondary stream mixing chamber is arranged in the secondary stream line downstream of or at the feed-in point of the mixture component into the secondary stream line. The secondary stream mixing chamber ensures that the metered-in mixture component is mixed with the carrier liquid, which flows through the secondary stream line, to homogenize the mixture. This is important particularly when delivery by the tank's metering pump proceeds discontinuously. This is for example the case when the metering pump is a reciprocating pump.

The system may additionally comprise at least one further tank for accommodating a mixture component, which may differ from the mixture component of the first tank. The further tank also comprises a discharge opening, which is connected upstream of or at the secondary stream mixing chamber to the secondary stream line. In this way, different mixture components may be metered into the secondary stream of the carrier liquid, the secondary stream mixing chamber ensuring homogenization of the mixture.

The second junction is arranged in the main stream line in particular downstream of the first junction. Further downstream of the second junction, a main stream mixing chamber is arranged in the main stream line. The main stream mixing chamber ensures that the mixture fed into the main stream line via the secondary stream line is intermixed further. The main stream mixing chamber is in particular arranged directly before the dispensing opening for the liquid mix. For this purpose, one or more nozzles may for example be arranged at the end of the main stream line e.g. in the case of a spray boom.

According to a further development of the system according to the invention, the drive unit has a data connection to a control unit. The control unit may control metered feed of the mixture component into the secondary stream. To match control to the mixture component located in the tank and the integral metering pump, the tank comprises, according to a further development of the system according to the invention, a data storage medium on which data relating to the metering volume of the metering pump and/or to the mixture component are stored. Data may be stored electronically or in another manner, for example by means of a code, for example a code pattern or a bar code. The metering pump is vented and calibrated in particular as early as during filling at the works. The calibration data may then be stored on the data storage medium.

According to a further development of the system according to the invention, the tank comprises a transponder, which comprises the data storage medium. The system in turn comprises a receiver coupled to the control unit for receiving the data stored on the data storage medium. In this way, the control unit may control the metering pump as a function of the calibration data of the metering pump and/or of the type of mixture component located in the tank.

According to a further development of the system according to the invention, it comprises a delivery unit for generating the main stream of carrier liquid. In this respect, the volumetric flow rate through the main stream line is variable, for example in a range from 0.08 l/min to approx. 2.80 l/min. The secondary stream line and/or the valve, on the other hand, are designed such that the volumetric flow rate of the carrier liquid through the secondary stream line is independent of the volumetric flow rate of the carrier liquid through the main stream line. This makes it possible to ensure that the same fluid pressure always prevails in the secondary stream line. Feed-in of the mixture component then always proceeds with the same volumetric flow rate of carrier liquid and is in particular independent of the volumetric flow rate through the main stream line. In this way, the metering pump integrated into the tank may be precisely matched to the mixture component contained in the tank and to a given delivery flow rate. This has the advantage that an inexpensive metering pump may be used.

In order to produce the secondary stream of carrier liquid through the secondary stream line, a valve, in particular a nonreturn valve, may be arranged in the main stream line between the first and second junctions.

In the method according to the invention a main stream of a carrier liquid is produced. At a first junction a secondary stream comprising part of the carrier liquid is branched off from the main stream and at a second junction it is fed back into the main stream. A metering pump, included in a tank for accommodating a mixture component, is driven by a drive unit coupled detachably to the metering pump and the mixture component located in the tank is fed in a metered manner into the secondary stream. The mixture of carrier liquid and mixture component is then fed into the main stream. The main stream, with the mixture of carrier liquid and mixture component, is then dispensed, for example sprayed out.

The method may be performed in particular by means of the above-described system. The method thus has the same advantages as the system.

In the method the metering pump is in particular driven hydraulically by the drive unit. Moreover, in the secondary stream the mixture is preferably homogenized in a secondary stream mixing chamber downstream of or at the feed-in point of the mixture component.

According to a further embodiment of the method according to the invention, the volumetric flow rate of the carrier liquid through the secondary stream line is independent of the volumetric flow rate of the carrier liquid through the main stream line. This ensures that the mixture component is always fed into the secondary stream against the same fluid pressure. This allows metering accuracy to be increased.

The mixture component of the method according to the invention and of the system according to the invention comprises in particular an active compound, preferably a plant protection product. Water may for example be used as the carrier liquid. In this case a liquid mixture of water and a plant protection product is thus dispensed.

The invention further relates to the use of the above-described system to dispense a mixture comprising a plant protection product.

The system according to the invention is particularly suitable for discharging liquid plant protection product. The system according to the invention may for example be used in conjunction with liquid plant protection products formulated as EC, EW, SC, ME, SE or OD. These types of formulation are familiar to a person skilled in the art, and described for example in H. Mollet, A. Grubenmann "Formulation technology", WILEY-VCH, Weinheim 2001, pp. 389-397 and literature cited therein.

An EC is understood by a person skilled in the art to be a liquid plant protection product formulation in which the plant protection active compound(s) are present as a homogeneous solution in an organic solvent or solvent mixture immiscible with water, the solution producing an emulsion when diluted with water.

An EW is understood by a person skilled in the art to be a liquid plant protection product formulation in which the plant protection active compound(s) are present in the form of an oil-in-water emulsion, at least one of the plant protection active compounds being present in the oil droplets.

An SC is understood by a person skilled in the art to be a liquid plant protection product formulation in which the plant protection active compound(s) are present in the form of solid, finely divided particles, which are suspended in an aqueous coherent phase. These formulations are also known as suspension concentrates.

An ME is understood by a person skilled in the art to be a liquid plant protection product formulation in which the plant protection active compound(s) are present in the form of a microemulsion, typically at least one of the protection active compounds typically being dissolved in the organic phase.

An OD is understood by a person skilled in the art to be a liquid plant protection product formulation in which the plant protection active compound(s) are present in the form of solid, finely divided particles, which are suspended in a non-aqueous coherent phase. These formulations are also known as oil dispersion concentrates.

An SE is understood by a person skilled in the art to be a liquid plant protection product formulation in which the plant protection active compound(s) are present in the form of solid, finely divided particles, which are suspended in a non-aqueous liquid phase, which is in turn emulsified in an aqueous phase. These formulations are also known as suspoemulsion concentrates.

In addition to one or more, preferably organic plant protection active compounds and at least one aqueous or non-aqueous diluent, the above-stated formulations generally comprise at least one surface-active substance, which is frequently selected from among anionic and nonionic emulsifiers and from among anionic and nonionic polymeric dispersion auxiliaries and which serves to form stable suspensions or emulsions when the formulation is diluted with water and, in the case of multiphasic liquid formulations such as EW, SC, ME, OD or SE, serves to stabilize the phases. The formulations optionally comprise "adjuvants", which improve the efficacy of the plant protection product(s). Furthermore, the formulations generally comprise one or more additives, such as additives for modifying rheological properties, antifreeze agents, colorants, and biocides in the quantities conventional for the respective formulation type.

The invention will now be explained with the aid of an exemplary embodiment and with reference to the drawings.

Figure 2:
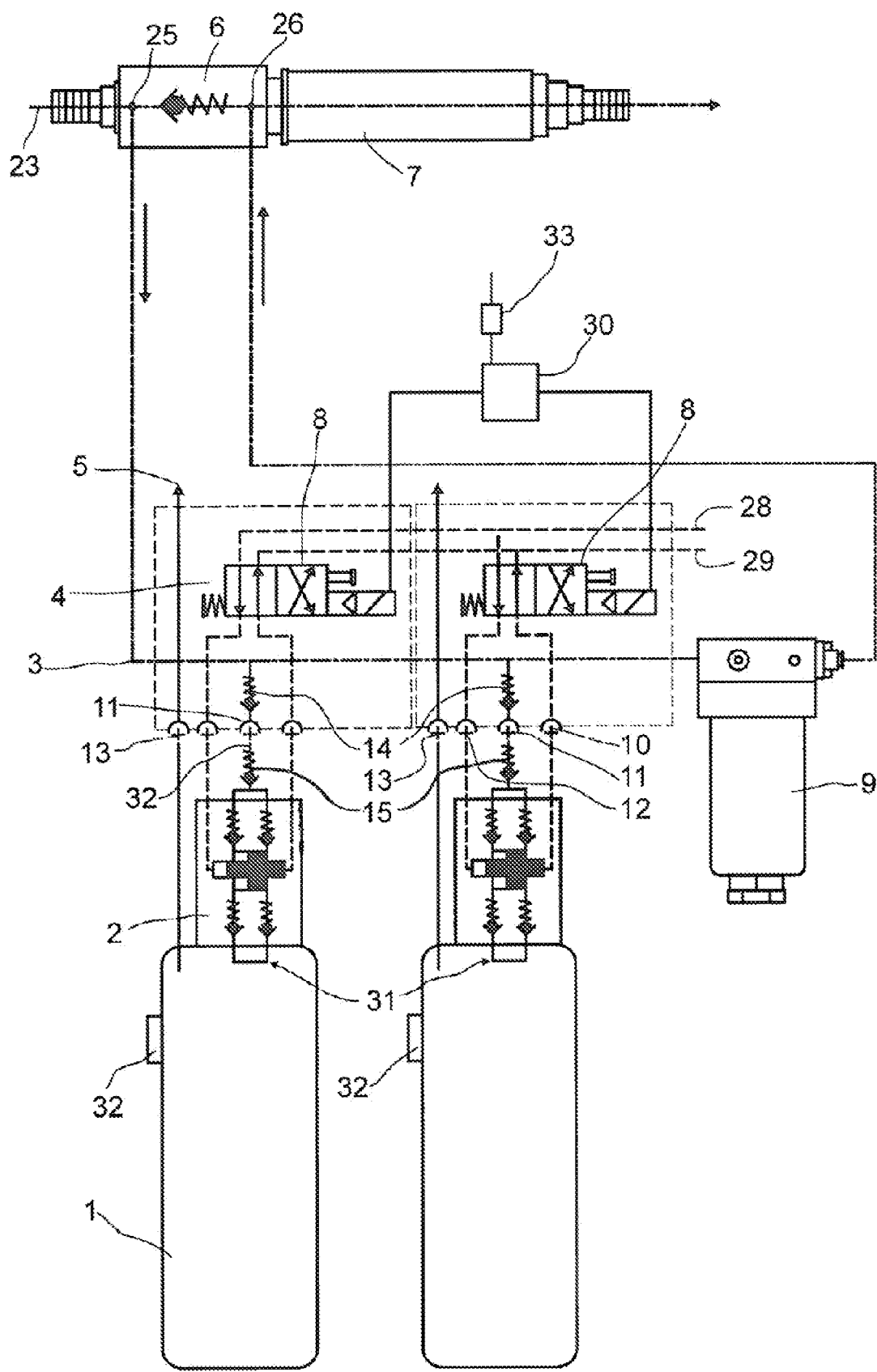

FIG. 1 shows the basic structure of an exemplary embodiment of the system according to the invention and FIG. 2 shows in detail the structure of the exemplary embodiment of the system according to the invention.

The exemplary embodiment comprises a system for dispensing a mixture of water and one or more plant protection products. The system comprises a "field sprayer", which is mounted on a trailer 20, which may be drawn over an agricultural field for example by means of a tractor.

A storage tank 24 is provided for the water constituting the carrier liquid. The water is pumped through a main stream line 23 by means of a pump 27. In this way a given volumetric flow rate is generated, which may vary over a wide range. At a first junction 25 of the main stream line 23 a secondary stream line 3 branches off from the main stream line 23. The secondary stream line 3 passes through one or more field sprayer apparatuses 4, as is explained below. At the field sprayer apparatuses 4, tanks 1 in the form of interchangeable containers are connected detachably to the secondary stream line 3.

Downstream of the field sprayer apparatus 4 a secondary stream mixing chamber 9 is arranged in the secondary stream line 3. Downstream of the secondary stream mixing chamber 9 the secondary stream line 3 leads back into the main stream line 23 at a second junction 26. The second junction 26 is arranged in the main stream line 23 downstream of the first junction 25. A secondary stream valve 6 is arranged between the first junction 25 and the second junction 26. Downstream of the second junction 26 there is arranged a main stream mixing chamber 7. This is mounted on a middle part of a boom 21 of the trailer 20. Finally the main stream line 23 leads into nozzles 22, which may be attached at various widths to the boom 21.

To dispense the liquid mixture onto the field, the trailer 20 is moved over the field and the plant protection product is metered directly into the stream of water flowing through the main stream line 23.

The system and the associated method for dispensing the mixture are explained in detail below with reference to FIG. 2:

The main stream of water arrives via the main stream line 23 at the first junction 25. Downstream of the first junction 25 the secondary stream valve 6 is arranged in the main stream. In the present exemplary embodiment this secondary stream valve 6 takes the form of a nonreturn valve. It produces a pressure drop, the magnitude of which depends on the opening pressure of the nonreturn valve and the volumetric flow rate of the water in the main stream line 23. The secondary stream valve 6 produces a secondary stream of water into the secondary stream line 3. The cross-section of the secondary stream line 3 and the configuration of the nonreturn valve 6 are selected such that, with an agriculturally conventional flow rate through the main stream line 23, a volumetric flow rate through the secondary stream line 3 is generated which varies distinctly less than the variation in the volumetric flow rate in the main stream line 23. The volumetric flow rate in the secondary stream line 3 preferably barely varies or does not vary at all. The volumetric flow rate through the secondary stream line 3 is thus in particular independent of the volumetric flow rate in the main stream line 23.

The variation in the main stream is brought about by different desired dispensing quantities, different widths of boom on which the sprayer nozzles 22 are mounted, and different operating speeds. For example, the volumetric flow rate of the main stream may vary within a range of from approx. 6 l/min to approx. 200 l/min. With such variation reliable metering of the plant protection product into the main stream in pulse volumes of plant protection product is very difficult. According to the invention, the optionally pulsed feed of the plant protection product therefore takes place into a secondary stream in the secondary stream line 3, in which the volumetric flow rate of the water does not vary as much or not at all.

In addition, as high as possible a flow rate is established in the secondary stream as a function of the pressure drop downstream of the secondary stream valve 6 and by selection of the cross section of the secondary stream line 3. In this way the secondary stream may be used to convey the apportioned plant protection product from the location of the tank 1 to the second junction 26, which may be arranged relatively far away on the spray boom of the trailer 20. In addition, the secondary stream in the secondary stream line 3 takes on conveyance of the metered-in plant protection product from the location of the secondary stream mixing chamber 9 to the location of the main stream mixing chamber 7.

Metering of the plant protection product located in the tanks 1 into the water stream in the secondary stream line 3 is explained below:

FIG. 2 shows two connection stations for two tanks 1. This illustration is merely an example. Very many more connection stations for tanks 1 may be provided, in particular in agriculture.

A metering pump 2 is an integral part of the tanks 1. The metering pump 2 takes the form, for example, of a dual-piston metering pump. It is distinguished by a simple and inexpensive structure and high reliability. The tank 1 further comprises a safety valve 15. The safety valve 15 is arranged on the side of the metering pump 2 remote from the tank 1 and always closes the connection of the tank 1 reliably when the tank 1 is not connected to a connection station of the field sprayer apparatus 4. The tank 1 comprises a discharge opening 31, which is connected, when a tank 1 is connected, via the metering pump 2, the safety valve 15 and a discharge line 32 to a connection 11 of the field sprayer apparatus 4. Detachable connection of the tank 1 to the field sprayer apparatus 4 proceeds via a suitable quick coupling system. Such quick coupling systems are known per se and not shown in FIG. 2.

Moreover, a venting line of the tank 1 is coupled via a connection 13 to a venting line 5 of the field sprayer apparatus 4.

The metering pump 2 is driven hydraulically by means of a drive unit of the field sprayer apparatus 4. It does not in particular have its own drive, but rather is externally driven and controlled. The drive unit comprises a hydraulic valve 8 and hydraulic lines 28 and 29. When in operation the metering pump 2 of the tank 1 is connected via two hydraulic connections 10 and 12 to the hydraulic lines 28, 29 of the drive unit. The hydraulic valve 8 is controlled electronically, i.e. opened and closed, by means of a control unit 30. In this way, the metering pump 2 may be driven hydraulically and pump plant protection product in a pulsed manner, i.e. discontinuously, out of the tank 1 into the discharge line 32 to the connection 11. From the connection 11 the plant protection product passes via a back pressure valve 14 into the water stream in the secondary stream line 3.

The back pressure valve 14, through which the plant protection product passes into the secondary stream line 3, is configured such that it always opens at a pressure of 10 bar irrespective of the back pressure present in the secondary stream of the secondary stream line 3. In this way, proper separation is always produced between the plant protection product and the water prior to feed in of the plant protection product. Plant protection product can only flow into the water in the secondary stream line 3 and never back in the opposite direction. Furthermore, this back pressure valve 14 ensures that the metering pump 2 in the tank 1 always delivers against a pressure of 10 bar. In this way, the back pressure is eliminated as an influencing variable on the pulse volume of the metering pump 2.

Since the dual piston metering pump 2 delivers in pulses, a secondary stream mixing chamber 9 is provided downstream of the feed-in point of the plant protection product into the secondary stream line 3. In the secondary stream mixing chamber 9 the plant protection product volumes metered in in pulses are mixed uniformly in the water stream and homogenized. By means of the secondary stream mixing chamber 9, a homogeneous mixture is thus produced from the pulses of at least one plant protection product and the secondary water stream in the secondary stream line 3.

From the secondary stream mixing chamber 9 the homogeneous mixture then passes as a continuous metered stream to the second junction 26. There the mixture is mixed into the main stream of the water. To achieve homogenization also after mixing into the main stream, a main stream mixing chamber 7 is provided downstream of the second junction 26.

Thus two mixing chambers 7, 9 with different purposes are arranged at different locations in the system. The secondary stream in the secondary stream line 3 in this respect ensures transportation of the mixture from the secondary stream mixing chamber 9 to the main stream mixing chamber 7.

Since two mixing chambers 7 and 9 are provided, the configuration of the main stream mixing chamber 7 may be simplified, since it only remains for a continuously supplied concentration to be mixed into an optionally varying main stream. A simple static mixing system may therefore be used for the main stream mixing chamber 7, which is very inexpensive.

The metering pump 2 of a tank 1 is calibrated at the plant protection product manufacturer's works when the tank 1 is filled with the plant protection product. On filling of the tank 1, the metering pump 2 is simultaneously vented. The calibration data are saved on a data storage medium 32, which is attached to the tank 1. The data storage medium 32 may in particular be a transponder in the form of a "radio chip". The pulse volume of the metering pump 2, determined on calibration, is stored on the data storage medium 32. In addition, data on the plant protection product accommodated in the tank 1 may be stored on the data storage medium 32.

When the tank 1 is connected to the field sprayer apparatus 4, the data stored on the data storage medium 32 are transferred to a receiver 33, which is coupled to the control unit 30. In this way, the control unit 30 may control the hydraulic valve 8 and thus the metering pump 2 in such a way that a given quantity of the plant protection product from the tank 1 is fed very accurately in a metered manner into the secondary stream line 3.

The exemplary embodiment of the system according to the invention is operated as follows:

The storage tank 24 is filled with a supply of water. In addition, the tanks 1 are connected to the field sprayer apparatus 4. The data stored on the data storage media 32 relating to the metering pumps 2 of the tanks 1 and to the plant protection products accommodated in the tanks 1 are read out via the receiver 33 and transmitted to the control unit 30.

The trailer 20 is then drawn over the agricultural field at a given speed. This speed is also transmitted to the control unit 30.

A water stream with a given volumetric flow rate is generated in the main stream line 23 by means of the pump 27. The pump 27 may in this case also be controlled by the control unit 30. The secondary stream in the secondary stream line 3 is generated as explained above by the non-return valve 6. The main stream in the main stream line 23 generates a pressure which opens the nonreturn valve 6 and thus produces a main stream to the nozzles 22. However, a pressure drop occurs, which ensures that part of the water of the main stream flows through the secondary stream line 3.

Via the hydraulic valves 8 the control unit 30 actuates the metering pumps 2 of the tanks 1 such that plant protection products are fed in a metered manner in pulses from the tanks 1 via the discharge lines 32 into the secondary stream line 3 in the desired quantity. The quantity of plant protection product metered into the secondary stream line 3 from the respective tanks 1 is in this case controlled very precisely by the control unit 30.

In the secondary stream mixing chamber 9 the mixture of water and the metered-in plant protection products is homogenized and finally fed back into the main stream at the second junction 26. In the main stream mixing chamber 7 the mixture is further homogenized and finally sprayed out onto the field via the nozzles 22.

The above-described system and the above-described method are used in particular with the above-stated plant protection products.

LIST OF REFERENCE NUMERALS

1 Tank
2 Metering pump
3 Secondary stream line
4 Field sprayer apparatus
5 Venting line
6 Secondary stream valve
7 Main stream mixing chamber
8 Hydraulic valve
9 Secondary stream mixing chamber
10 Connection
11 Connection
12 Connection
13 Connection
14 Back pressure valve
15 Safety valve
20 Trailer
21 Boom
22 Nozzles
23 Main stream line
24 Storage tank
25 First junction
26 Second junction
27 Pump
28 Hydraulic line
29 Hydraulic line
30 Control unit
31 Discharge opening
32 Data storage medium
33 Receiver

The invention claimed is:

1. A system for dispensing liquid mixtures, comprising:
   a main stream line for passage of a main stream of a carrier liquid;
   a secondary stream line branching off from the main stream line at a first junction and leading back into the main stream line at a second junction, wherein the second junction is arranged in the main stream line downstream of the first junction;
   a metering pump drive unit;
   a detachable tank for accommodating a mixture component, wherein the detachable tank comprises an integral metering pump for delivering the mixture component through a discharge line into the secondary stream line between the first junction and the second junction, wherein a mixture component rate of the integral metering pump matches an application rate for the mixture component contained in the detachable tank, and wherein the metering pump drive unit is detachably coupled to the metering pump to drive the metering pump.

2. The system of claim 1, further comprising:
   a second detachable tank having a second integral metering pump, wherein the metering pump drive unit is detachably coupled to the second integral metering pump to drive the second integral metering pump.

3. The system of claim 1, further comprising a secondary stream mixing chamber arranged in the secondary stream line downstream of or at a feed-in point of the mixture component into the secondary stream line.

4. The system of claim 1, further comprising:
   a second main stream line for passage of a second main stream of a second carrier liquid;
   a second secondary stream line branching off from the second main stream line at a respective first junction and leading back into the second main stream line at a respective second junction, wherein the respective second junction is arranged in the second main stream line downstream of the respective first junction; and
   a second detachable tank for accommodating a second mixture component, wherein the second detachable tank comprises a second integral metering pump for delivering the second mixture component through a second discharge line into the second secondary stream line between the respective first junction and the respective second junction, wherein the metering pump drive unit is detachably coupled to the second integral metering pump to drive the second integral metering pump.

5. The system of claim 1, further comprising a main stream mixing chamber arranged in the main stream line downstream of the second junction.

6. The system of claim 1, further comprising a valve arranged in the main stream line between the first and second junctions.

7. The system of claim 1, further comprising a delivery unit for generating the main stream of carrier liquid, a volumetric flow rate through the main stream line being variable, wherein at least one of the secondary stream line and the valve is designed such that a volumetric flow rate of the carrier liquid through the secondary stream line is independent of a volumetric flow rate of the carrier liquid through the main stream line.

8. The system of claim 1, further comprising:
a control unit having a data connection to the metering pump drive unit, wherein the control unit controls a metered feed of the mixture component into the secondary stream line, and wherein the detachable tank further comprises a transponder, the transponder having a data storage medium for storing data relating to at least one of a metering volume of the integral metering pump and the mixture component; and
a receiver coupled to the control unit for receiving the data stored on the data storage medium.

9. The system of claim 2, further comprising a secondary stream mixing chamber arranged in the secondary stream line downstream of or at a feed-in point of the mixture component into the secondary stream line.

10. The system of claim 9, further comprising at least one further tank for accommodating a mixture component, the at least one further tank comprising a discharge opening connected upstream of or at the secondary stream mixing chamber to the secondary stream line.

11. The system of claim 2, further comprising a main stream mixing chamber arranged in the main stream line downstream of the second junction.

12. The system of claim 2, further comprising a valve arranged in the main stream line between the first and second junctions.

13. The system of claim 2, further comprising a delivery unit for generating the main stream of carrier liquid, a volumetric flow rate through the main stream line being variable, wherein at least one of the secondary stream line and the valve is designed such that a volumetric flow rate of the carrier liquid through the secondary stream line is independent of a volumetric flow rate of the carrier liquid through the main stream line.

14. A method for dispensing liquid mixtures, comprising:
providing a main stream line having a main stream of a carrier liquid,
providing a secondary stream line at a first junction from the main stream line, the second stream line having a secondary stream comprising a portion of the carrier liquid,
providing a metering pump drive unit;
supplying a metered feed of a mixture component from a detachable tank into the secondary stream to form a mixture, wherein the metered feed is provided by a metering pump that is integral with the detachable tank, where the integral metering pump is detachably coupled to the metering pump drive unit, and wherein a delivery volume of the integral metering pump matches a delivery volume of the mixture component.

15. The method of claim 14, further comprising:
providing a second detachable tank having a second integral metering pump, wherein the metering pump drive unit is detachably coupled to the second integral metering pump to drive the second integral metering pump.

16. The method of claim 14, wherein in the secondary stream, the mixture of the carrier liquid and the mixture component is homogenized in a secondary stream mixing chamber downstream of or at a feed-in point of the mixture component.

17. The method of claim 14, wherein a volumetric flow rate of the carrier liquid through the secondary stream line is independent of a volumetric flow rate of the carrier liquid through the main stream line.

18. The method of claim 14, wherein the mixture component comprises an active compound.

19. The method of claim 14, wherein the active compound is a plant protection product.

20. A system for dispensing liquid mixtures, comprising:
a first main stream line for passage of a first main stream of a carrier liquid;
a secondary stream line branching off from the first main stream line at a first junction and leading back into the first main stream line at a second junction, wherein the second junction is arranged in the first main stream line downstream of the first junction;
a second main stream line for passage of a second main stream of the carrier liquid;
a second secondary stream line branching off from the second main stream line at a respective first junction and leading back into the second main stream line at a respective second junction, wherein the respective second junction is arranged in the second main stream line downstream of the respective first junction;
a metering pump drive unit;
a first detachable tank for accommodating a first mixture component, wherein the first detachable tank comprises a first integral metering pump for delivering the first mixture component through a discharge line into the secondary stream line between the first junction and the second junction, wherein the metering pump drive unit is detachably coupled to the first integral metering pump to drive the first integral metering pump; and
a second detachable tank for accommodating a second mixture component, wherein the second detachable tank comprises a second integral metering pump for delivering the second mixture component through a second discharge line into the second secondary stream line between the respective first junction and the respective second junction, wherein the metering pump drive unit is detachably coupled to the second integral metering pump to drive the second integral metering pump.

21. The system of claim 20, further comprising;
a storage tank having the carrier liquid, wherein the first main stream line and the second main stream line originate from the storage tank.

* * * * *

UNITED STATES PATENT AND TRADEMARK OFFICE
CERTIFICATE OF CORRECTION

PATENT NO. : 11,096,385 B2
APPLICATION NO. : 14/364901
DATED : August 24, 2021
INVENTOR(S) : Wolf-Dieter Wichmann It is certified that error appears in the above-identified patent and that said Letters Patent is hereby corrected as shown below:

In the Claims

At Column 11, Line 51, "unit;" should be -- unit, --.

At Column 12, Line 54, "comprising;" should be -- comprising: --.

Signed and Sealed this
Thirty-first Day of May, 2022

Katherine Kelly Vidal
*Director of the United States Patent and Trademark Office*